Patented Jan. 10, 1928.

1,655,573

UNITED STATES PATENT OFFICE.

ROLAND P. SOULE, OF NEW YORK, N. Y., ASSIGNOR TO COMBUSTION UTILITIES CORPORATION, OF NEW YORK, N. Y., A CORPORATION OF MAINE.

INSECTICIDE.

No Drawing.   Application filed June 23, 1924. Serial No. 721,669.

This invention relates to insecticides, and more particularly to a new and useful article of manufacture, which possesses valuable insecticidal properties.

Pyridine, which is the simplest nitrogen base of ordinary coke-oven tar, is known to be poisonous to fly larvæ, maggots, and other pests, but it is expensive and too limited in its effectiveness for general commercial application. Nicotine, which contains a pyrrolidine group, as well as a pyridine nucleus, possesses a higher toxicity to insects than pyridine and is a contact insecticide of wide applicability. It is quite widely used on crops of sufficient value to justify its rather high cost. So far as is known, therefore, the nitrogen bases of coal tar have had no important industrial application as insecticides, and the use of nicotine and compounds derived therefrom is restricted by their expense.

The primary object of the present invention is the production of a nitrogenous insecticide that is both effective and relatively inexpensive.

The composition comprising the subject matter of the present invention may be described as consisting essentially of a mixture of organic heterocyclic nitrogen compounds soluble in dilute mineral acid (e. g. 20% sulfuric acid) and/or of the hydrochloride or sulphate salts of said compounds; these compounds being the hydrogenated and alkylated derivatives of pyridine, quinoline, acridine, and homologous polycyclic nitrogen bases which are found in coke-oven tar. These products differ from nicotine by the absence of a pyrrolidine group, and they differ from pyridine and the related nitrogen bases in coke-oven tar in their higher content of hydrogen and usually also in their greater number of alkyl side-chains. This difference in constitution is indicated by the fact that the nitrogen compounds forming the subject of the present invention have a higher molecular weight, lower density and lower refractive index than coke-oven nitrogen bases of similar boiling range. It is believed, moreover, that this higher content of hydrogen and alkyl groups is the chief reason for their increased effectiveness and broadened scope of application as insecticides.

This mixture of organic heterocyclic nitrogen compounds can be prepared from the liquid products of distillation of coal or other bituminous material, provided that the conditions of the distillation are sufficiently mild to preserve these liquid products in their primary state; e. g., substantially unaltered in composition and largely protected from secondary decomposition into compounds of the aromatic series. In the patent to Henry L. Doherty No. 1,426,159, granted August 15, 1922, and in the British patent of Henry O. Loebell, 216,388 of May 23, 1923, "Manufacture of fuel gas," two gas making processes are described, by either of which fuel is distilled under such mild conditions as to produce substantially primary tar. In these processes the fuel is passed downwardly through a shaft furnace at a gradual rate and during its passage through the furnace it is heated and carbonized solely by sensible heat supplied by a rising current of hot gases. By passing this gas current in a direction opposed to that in which the fuel is advancing the fuel is heated gradually and the gas is correspondingly cooled through the transfer of its heat. This method of operation results in exceedingly mild conditions of distillation and carbonization, since the volatile products distilled from the coal are mixed with and carried off by the current of heating gas rising through the upper and cooler portions of the charge. Thus the tar vapors are not exposed to temperatures much above those at which they are first liberated, and therefore are almost completely preserved in their primary composition.

This primary tar is clearly distinguishable both in chemical and physical properties from ordinary tars produced at the high temperatures of the gas-works or coke-oven. For example, the nitrogen compounds present in coke-oven tar consist almost entirely of tertiary bases of the pyridine-quinoline-acridine series. They may be regarded as compounds derived from the aromatic hydrocarbons by the replacement of a carbon atom by a nitrogen atom, and just as naphthalene preponderates among the hydrocarbons of coke-oven tar, so does quinoline, or the tertiary nitrogen base derived from naphthalene, preponderate among the nitrogen bases of coke-oven tar. The nitrogen bases of a primary tar such as described above, on the other hand, may be regarded as compounds derived from the hydroaromatic or cyclic unsaturated non-benzenoid hydrocarbons. No single compound, analogous to quinoline, is present in large proportion in this mixture of unsaturated nitrogen bases, although the dihydro-derivatives of quinoline and isoquinoline have been found in small quantities. Finally, whereas the nitrogen compounds from coke-oven tar are tertiary bases for the most part, the nitrogen compounds from primary tar are mixtures of both tertiary and secondary bases.

This mixture of primary nitrogen bases and/or of the mineral acid salts of such bases possesses valuable insecticidal properties, and in addition can be produced at relatively small cost. The primary tar is distilled to a soft pitch and the distillate freed of tar acids by extraction with weak alkali. If the tar has been produced from ordinary bituminous coal, the residual oil may contain two to three percent of nitrogen bases, and is then treated with twenty percent sulfuric acid or with other dilute mineral acid. The nitrogen bases or convenient fractions thereof which are liberated from the acid solution by treatment with caustic alkali comprise the mixture which is the subject of the present invention. Because of the large proportion of valuable and useful products which can be obtained from the primary liquid distillates of coal or other bituminous material, the manufacturing cost of this insecticidal agent is proportionately low.

The following brief description is offered as a specific example of the procedure to be followed in the preparation of a water soluble insecticide of the character comprising the subject of the present invention:—A primary tar obtained by the mild carbonization of Elkhorn coal in accordance with the process described in the aforementioned Loebell British Patent 216,388, May 23, 1923, is distilled to an end point at which a pitch residue having a 150° F. melting point is obtained. The distillate formed comprises by volume about 50% of the original primary tar and it contains by volume upwards of 25% of tar acids. This distillate is extracted with a 10% sodium hydroxide solution, the volume of hydroxide used being sufficient to effect the complete removal of the tar acid content of the distillate. The tar acid free distillate is then extracted with a sufficient volume of a 20% sulphuric acid solution to effect complete separation of all of the nitrogen bases present in the distillate, and the nitrogen bases in the acid extract are then liberated by neutralizing the extract with caustic alkali. To every 20 grams of the nitrogen bases thus liberated there is added 6.8 grames of rosin and the mixture is heated with stirring until the rosin has dissolved in the oil. To this mixture 4 cc. of sodium hydroxide solution is added, of such concentration that there are 200 grams of sodium hydroxide per liter of solution, and the heating and stirring is continued until foaming commences. The mixture is then allowed to cool, and diluted with water to give stable emulsions of any desired concentration of nitrogen bases.

These nitrogen bases have been found of value either by themselves or in admixture with tar-acids or other primary tar compounds, not only in making up insecticidal and disinfectant oils, but also as flotation oils and for other purposes. It will be apparent that they can be prepared from any sort of coal or bituminous material by any distillation process wherein the conditions are sufficiently mild to preserve the primary nitrogen bases in a substantially undecomposed condition.

The subject matter of the present invention having been thus described, what is claimed as new is:

1. An insecticide containing hydrogenated and alkylated derivatives of pyridine, quinoline, acridine and homologous polycyclic nitrogen bases in admixture with a mineral acid salt of the same.

2. An insecticide containing a mixture of the organic hetero-cyclic nitrogen compounds naturally occurring in the tar acid free distillate of a primary tar of the class described.

3. An insecticide containing a mixture of the hydrogenated derivatives of pyridine, quinoline, acridine and homologous poly-cyclic nitrogen bases naturally occurring in the tar acid free distillate of a primary tar of the class described.

4. An insecticide containing a mixture of the alkylated derivatives of pyridine, quinoline, acridine and homologous poly-cyclic nitrogen bases naturally occurring in a primary tar of the class described.

5. An insecticide containing the salts produced by reacting a mineral acid with hydrogenated and alkylated derivatives or pyridine, quinoline, acridine and homologous poly-cyclic nitrogen bases.

6. An insecticide containing hydrogenated and alkylated derivatives of quinoline, acridine and homologous poly-cyclic nitrogen bases.

7. An insecticide containing the salts produced by reacting a mineral acid with the alkylated derivatives of pyridine, quinoline, acridine and homologous poly-cyclic nitrogen bases.

8. An insecticide containing salts produced by reacting a mineral acid with the hydrogenated derivatives of pyridine, quinoline, acridine and homologous poly-cyclic nitrogen bases.

9. An insecticide containing dihydro-quinoline in admixture with other nitrogen base derivatives of cyclic unsaturated non-benzenoid hydrocarbons.

10. An insecticide containing dihydro-isoquinoline in admixture with other nitrogen base derivatives of cyclic unsaturated non-benzenoid hydrocarbons.

In testimony whereof I affix my signature.

ROLAND P. SOULE.